(No Model.)
E. H. BUTTS.
BALING PRESS.
No. 570,865.  Patented Nov. 3, 1896.
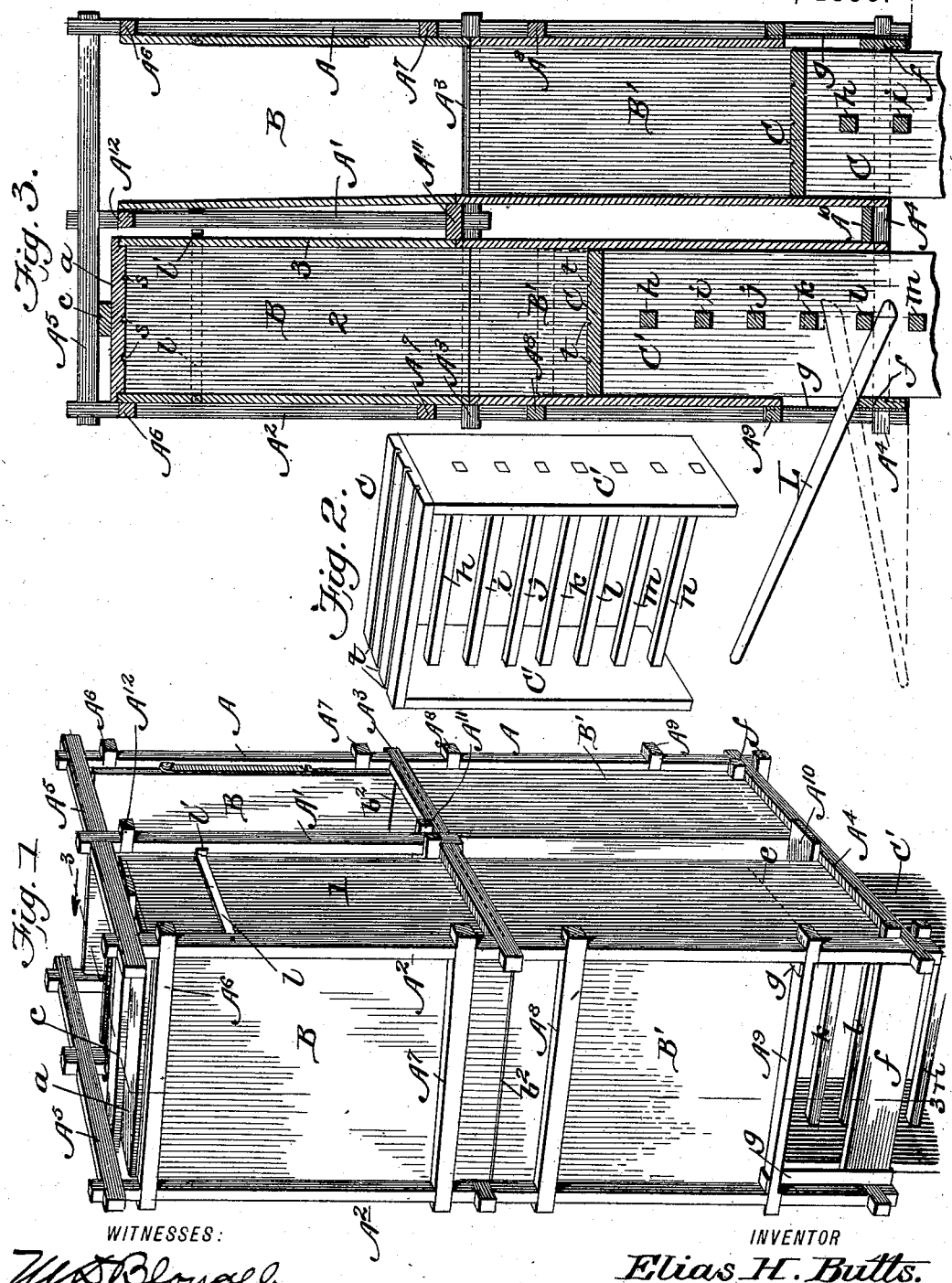
WITNESSES:
INVENTOR
Elias H. Butts.
BY Munn & Co.
ATTORNEYS.

UNITED STATES PATENT OFFICE.

ELIAS H. BUTTS, OF ORIENTAL, NORTH CAROLINA, ASSIGNOR OF ONE-HALF TO WILLIAM H. LEWIS, OF MERRITT, NORTH CAROLINA.

BALING-PRESS.

SPECIFICATION forming part of Letters Patent No. 570,865, dated November 3, 1896.

Application filed July 31, 1896. Serial No. 601,130. (No model.)

*To all whom it may concern:*

Be it known that I, ELIAS H. BUTTS, of Oriental, in the county of Pamlico and State of North Carolina, have invented a new and useful Improvement in Hay-Presses, of which the following is a specification.

The object of my invention is to provide a cheap, simple, and practical press for baling hay by hand; and it consists in the peculiar construction and arrangement of the press-box, platen, and separate or detached hand-levers, which I will now proceed to fully describe with reference to the drawings, in which—

Figure 1 is an elevation in perspective of the press; Fig. 2, a perspective view of the follower and platen, and Fig. 3 a vertical longitudinal section on line 3 3 of Fig. 1.

The press is an upright one formed with corner-posts A $A^2$, inclosing two separate press-boxes, which are constructed exactly alike, one of which is designed to be filled with hay while the other is employed in pressing, and vice versa.

$A^3$ is a middle cross-bar, $A^4$ a bottom cross-bar, and $A^5$ a top cross-bar connecting the corner-posts.

$A^{10}$ is a middle horizontal bar connecting the two lower cross-bars $A^4$, $A^{11}$ are middle horizontal bars connecting the middle cross-bars $A^3$, and $A^{12}$ is a top horizontal bar connecting the top cross-bars $A^5$. These bars $A^{10}$ $A^{11}$ $A^{12}$, in connection with middle vertical bar $A'$, connecting cross-bars $A^3$ $A^5$, divide the press-frame into two vertical sections exactly alike, each having its own press-box and platen.

It will only be necessary to describe one of these presses, which will be the one nearest the observer in Fig. 1. This has a lower filling-box $B'$, contained within the cross-bars $A^8$ $A^9$, and whose sides are stationary, and an upper press-box B, held between bars $A^6$ and $A^7$, in which the bale is compressed and three of whose sides are removable to permit the removal of the bale. The two boxes join together on the line $b^2$. The compressing-box B has a removable top or cover $a$, held down by a locking-bar $c$, whose ends are caught and held beneath cross-bars $A^5$ $A^5$.

C, Fig. 2, is the platen, which fits in the boxes $B'$ and B and moves upwardly in the same to compress the hay into a bale. This platen has at its opposite ends two strong downwardly-projecting sides $C'$, arranged at right angles to the platen and connected together by a series of strong cross-bars $h\ i\ j\ k\ l\ m\ n$, after the manner of the rounds of a ladder, and which form successive "holds" for a pair of detached levers to work on with a step-by-step motion, said levers being detached and operating like crowbars.

The downwardly-projecting side extensions of the follower fit against and are of the same transverse dimensions as the interior end walls of the press-box, and the connecting-bars extend all the way across the box from side extension to side extension, so that the latter fit closely to the sides of the box and act as guides to cause the follower to move easily up and down without cramping, which is very necessary in view of the fact that the working levers cannot always be applied exactly in the center, and hence, when not so centrally applied, some means are necessary to permit the platen from becoming skewed and jammed, and this is provided for by making the downward side extension to act as guides parallel to the walls of the box, as well as supports for cross-bars.

Underneath each one of the boxes $B'$ there is a strong fulcrum-bar $f$, arranged with its greatest width in a vertical plane and connected to the cross-bars $A^9$ by metal straps $g$.

The follower (seen in Fig. 2) rests in the lower box $B'$, with its platen-surface about on a level with the line $e$, Fig. 1, and the hay is filled in and tramped down on the top of this platen within the box $B'$ until a sufficient quantity has been inserted, when the platen is gradually raised to compress the hay and force it into the upper box B. This elevation of the follower is effected by two stout wooden hand-levers L in the hands of two persons, one of which is placed upon the fulcrum-bar $f$ and caught beneath the upper bar $h$ of the follower, and then depressed to raise the follower, after which the other workman rests his lever L upon the fulcrum-bar $f$, and, catching the next or second bar $i$ of the follower, raises it a step, while the first workman withdraws his lever, places it upon the fulcrum-bar again, and catches the third bar $j$ of the follower, and so on until the follower is forced up to the end of its movement and the bale is compressed within the box B. A temporary locking-bar of any kind is then placed upon the fulcrum-bars $f$ beneath the follower to hold it, and the working levers are then withdrawn and the bale tied with bands and removed from the upper box B. To do this, sides 1 2 3 of the compressing-box are removed by unlocking the metal bars $l\ l'$. Bars $l$ are pivoted to posts $A^2$, and have hooked ends that catch over notches in the ends of bar $l'$ behind side 3, so that they are easily disconnected. The wires or bands are then passed around the bale through the scores $s$ in the top $a$ and scores $t$ in the platen C, and after the bale is tied the platen is released and the bale removed.

Having thus described my invention, what I claim as new, and desire to secure by Letters Patent, is—

1. A baling-press comprising an upper box within which the baling is effected, a lower box for receiving the material, a platen arranged within the lower box and having downward side extensions lying against and of the same size as the interior end walls of the press-box and provided with a series of ladder-like connecting-bars extending from side extension to side extension entirely across the box and forming a follower, a stationary fulcrum-bar arranged beneath the filling-box, and separate detached hand-levers adapted to fulcrum upon the fulcrum-bar and operate alternately upon the series of ladder-like bars of the follower, substantially as and for the purpose described.

2. A double baling-press having on each side an upper box within which the baling is effected, a lower box for receiving the material, a platen arranged within the lower box and having downward side extensions lying against and of the same size as the interior end walls of the press-box and provided with a series of ladder-like connecting-bars extending from side extension to side extension entirely across the box and forming a follower, a stationary fulcrum-bar arranged beneath each lower box, and separate and detached hand-levers substantially as and for the purpose described.

3. A double baling-press comprising four corner-posts $A\ A\ A^2\ A^2$ with end cross-bars $A^4\ A^3\ A^5$ and side bars $A^6\ A^7\ A^8\ A^9$, the dividing-bars $A^{10}\ A^{11}\ A^{12}$, vertical middle bars $A'$ between the baling-boxes, the cover $a$ with cross-bar $c$, the fulcrum-bars $f$ arranged beneath each filling-box, a follower for each filling-box consisting of a platen with downwardly-extending side bars fitting against the interior side walls of the box and connected by a series of ladder-like bars extending across the box, and separate and detached hand-levers substantially as and for the purpose described.

ELIAS H. BUTTS.

Witnesses:
 W. J. PARKER,
 GEO. T. FARNELL.